May 22, 1945.   W. J. MILLER   2,376,799
FRICTION CLUTCH
Filed Jan. 15, 1942
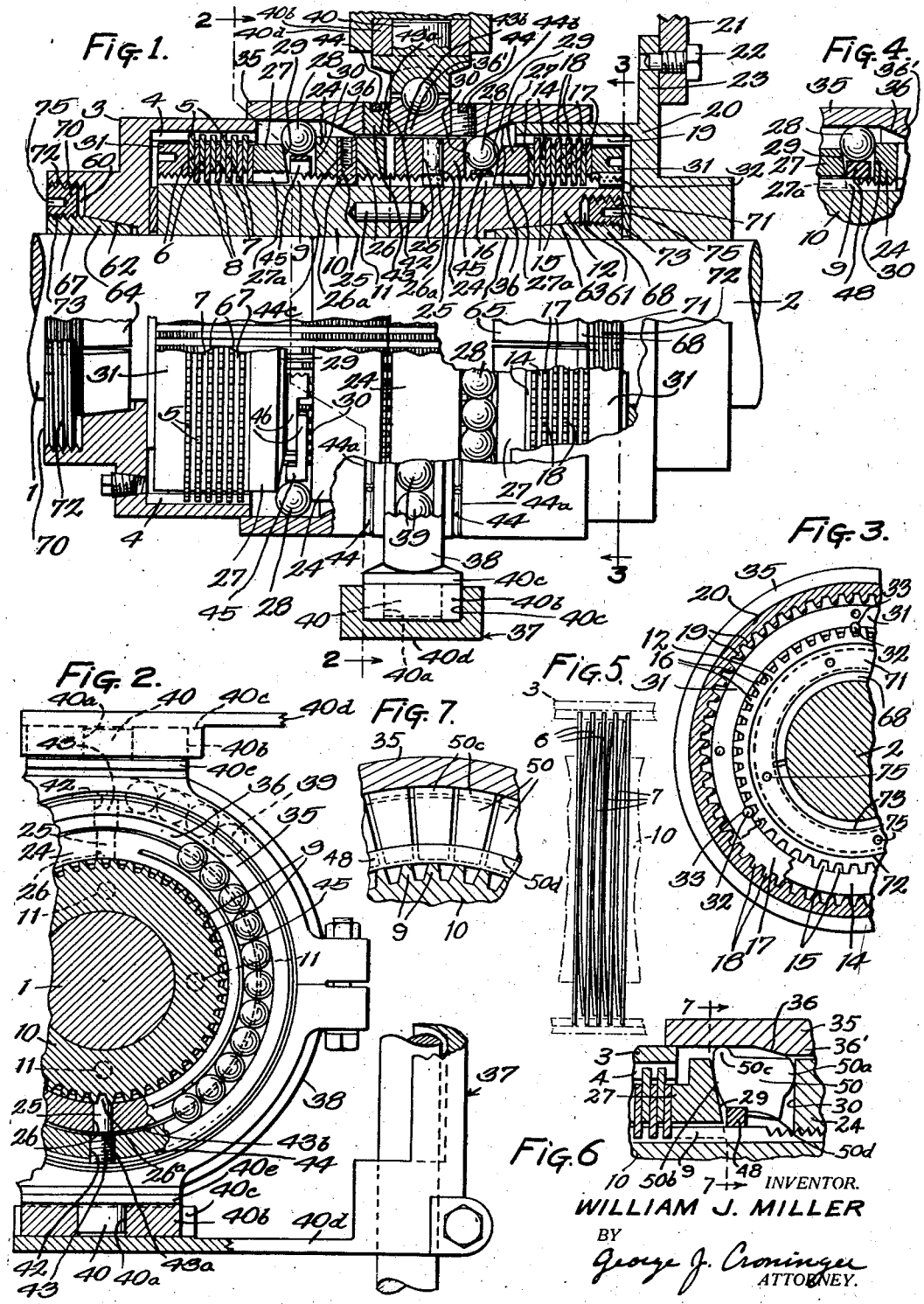
INVENTOR.
WILLIAM J. MILLER
BY
George J. Croninger
ATTORNEY.

Patented May 22, 1945

2,376,799

UNITED STATES PATENT OFFICE 2,376,799

FRICTION CLUTCH

William J. Miller, Swissvale, Pa., assignor to Miller Pottery Engineering Company, Swissvale, Pa., a corporation of Pennsylvania Application January 15, 1942, Serial No. 426,876

14 Claims. (Cl. 192—93)

This invention relates to friction clutches, particularly multiple disc type clutches.

The objects of the invention are to provide a clutch that will be simple in construction yet highly dependable and efficient in operation; that will be inexpensive to produce; that may be adjusted for wear or application to a high degree of accuracy with the least amount of effort; and that will constitute a very compact assemblage of the least number of operating parts.

Another object is to provide such a clutch device wherein various sizes of same may be expeditiously produced at a low cost and with a minimum waste of material, especially in producing the various sizes of sets of clutch discs required.

Another object is to provide such a device having normally enclosed clutch disc applying means which may be readily adjusted without having to dismantle any of the main operating parts constituting the enclosure.

Other objects and advantages will become apparent by reference to the specification and the accompanying drawing, in which:

Fig. 1 is a view partly in elevation and partly in section of one form of the clutch device.

Fig. 2 is a cross-section of the device as taken on the section line 2—2 of Fig. 1.

Fig. 3 is another cross section of the device as taken on the section line 3—3 of Fig. 1.

Fig. 4 is a detail of Fig. 1 showing certain modifications.

Fig. 5 is a diagrammatic view illustrating construction of the clutching discs of Fig. 1 and the manner in which they cooperate to insure release thereof.

Fig. 6 is an enlarged detail of a modified form of clutch disc applying means of the invention.

Fig. 7 is a section taken on the section line 7—7 of Fig. 6.

In Fig. 1, the clutch device is shown as applied for coupling a driving shaft 1 with a co-axially arranged driven shaft 2 and including means by which a braking effect may be applied to the driven shaft after the release thereof from the driving shaft.

For this purpose, the device includes a cupped driving hub 3 secured to the drive shaft 1 and having an internal gear formation 4 within which is slidably received the external teeth 5 of outer driving clutch discs 6. Between the clutch discs 6 are arranged driven inner clutch discs 7 having internal teeth 8 meshing with the external teeth 9 of a driving sleeve 10 telescoping the ends of the shafts 1 and 2 and connected by means of pins 11 with a similar sleeve 12 secured to the driven shaft 2, whereby power will be transmitted from the shaft 1 to the shaft 2 when the clutch discs are clamped together, as later described.

Arranged about the sleeve 12 are inner clutch discs 14 having internal teeth 15 meshing with external gear teeth 16 of said sleeve, and between which discs are arranged outer clutch discs 17 having external teeth 18 meshing with the internal gear formation 19 of a normally stationary cupped hub 20, whereby as the discs 14 and 17 are clamped together, the driven shaft 2 may be gradually or otherwise coupled with the stationary hub 20 and be suddenly or gradually stopped thereby from rotating, depending upon the pressure under which the said discs are clamped. This hub 20 may be held from rotating by being connected to a stationary frame part 21 by a bolt 22 passing through a lug 23 on the hub.

Threaded on the inner end of each sleeve 10 and 12 is an abutment collar 24 held in angular adjusted positions longitudinally of the sleeve by a pair of key-pins 25 removably received in radial apertures 26 in opposite sides of the collar, each pin having a tooth-shaped end 26a engaged between gear teeth of the sleeve.

Slidably received on each sleeve 10 and 12 is a disc clamping ring 27 having internal gear teeth 27a meshing with the external gear teeth 9 or 16 of its respective sleeve to rotate therewith while being free to slide back and forth thereon. Between each ring 27 and its adjacent abutment collar 24 is an annular series of rollable elements or balls 28 arranged to be contracted, by means later described, to cooperate with the tapered side 29 of the clamping rings and flat side 30 of the collars to urge the rings against their respective sets of clutch discs and cause the same to be clamped together against a stop ring 31 threaded on the outer end of each sleeve whereby either the hub 3 or hub 20 may be coupled with the driven shaft 2 by way of the sleeves.

Each stop ring 31 is held from rotating on its respective sleeve 10 or 12, by means of a plurality of key pins 32 (Fig. 3) which are confined between longitudinal notches 33 in the threaded interior wall of the rings and the teeth of the sleeves. Thus, said rings may be adjusted longitudinally on their respective sleeves with a high degree of precision in view of the slight angular adjustment permitted therebetween about the axis thereof in accordance with the great number of gear teeth formed on the sleeves, to thereby more accurately determine the pressure under which the clamping discs may be applied, at least when the device is being assembled on the shafts.

The sets of balls 28 are contracted and released by a shifter sleeve 35 reciprocably and rotatably mounted over the hub 3 and braking hub 20 and provided with opposed inwardly tapered cam formations 36 of an inwardly enlarged central portion 36' of the sleeve, arranged to alternately contract and release the sets of balls as the shifter sleeve is shifted axially in opposite directions and to release both sets of balls when the shifter sleeve is in a neutral position. This shifter sleeve may be operated by an oscillatable shifter yoke 37 through a two part, or split, shifter ring 38 surrounding the sleeve and connected therewith through a ball bearing connection 39 therebetween.

The shifter ring 38 is in sliding pivotal connection with the shifter yoke by having opposite trunnions 40 received in bearings 40a of guide blocks 40b slidably received in longitudinal guideways 40c in the arms 40d of the yoke and engaging enlarged shoulders 40e of the trunnions to prevent the shifter ring from oscillating about its axis and binding between the arms of the yoke when shifted thereby.

The central portion 36' of sleeve 35 clears the periphery of the abutment collars 24 to retain the key pins 25 of the collars engaged with the gear formations of the sleeves 10 and 12. In opposite sides of the central portions 36' of the shifter sleeve at each side of the shifter ring 38 are threaded radial apertures 42 which are normally closed by threaded plugs 43 having curved inner ends 43a lying in the plane of the inner wall 43b of the said central sleeve portion and held from rotating by a pair of split wire retaining rings 44 received in grooves 44a in the periphery of the shifter sleeve and engaging slots 44b in the plugs. To adjust the abutment collars 24 on the sleeves to determine the amount of pressure applied to the clamping discs by the clamping rings 27 upon contraction of either set of balls 28, the sleeve 35 is shifted to neutral, the plugs 43 are removed and the proper aligned apertures 42 are centered over the opposed key pins 25 of a collar. A threaded tool (not shown) of smaller diameter than the holes 42 is inserted and screwed into the threaded socket 44c in a key pin 25 and the pin lifted out from between the teeth of sleeves 10 or 12 as the case may be and removed through hole 42. The end of a larger diameter rod (not shown) is then inserted through the hole 42 and socketed in the hole 26 to turn the collar 24 in the desired direction about the axis of shaft 1 to effect the adjustment. The method of replacing the key is obvious.

To insure proper release of each set of balls 28 from their contracted position, they are arranged about a resilient ring 45 which urges them in an outward direction when contracted. This ring may be made of spring material with overlapping ends 46 to insure contact with and exert equal outward pressure on all the balls of the series when either contracted or expanded, as shown in Fig. 1, or the ring may constitute a band 48 of solid rubber arranged about each sleeve 10 and 12, as seen in Fig. 4.

In substitution for the balls 28, an annular series of rollable or rockable wedging blocks 50 may be employed, as shown in Figs. 6 and 7. The blocks 50 are formed with a curved rear-end portion 50a adapted to rock upon the flat wide walls 30 of the abutment collars 24, and have a curved front end portion 50b adapted to engage the tapered sides 29 of the pressure rings 27 and being arranged to actuate the ring when the blocks are rocked inwardly by the cam formations 36 of the shifter sleeve when shifted. The blocks have an upward extension 50c at their front ends for engaging the cam formations and are constantly urged outwardly in expanded relation by a rubber ring 48 engaged within an offset formation 50d in the forward portion of the bottom end of each block. In this form, the central enlarged portion 36' of the shifter sleeve, in all of its positions, overlaps at least the rear ends of the blocks to confine same in proper operating position between the collars 24 and pressure rings 27.

To separate the cooperating inner and outer discs of each set of same, the inner discs of each set may, if desired, be slightly arcuately warped, as shown in Fig. 5, and formed of spring material to serve as resilient spacers between the outer discs.

Means are provided whereby the driving hub 3 and the sleeve 12 may be more firmly secured on their respective shafts 1 and 2, expeditiously, in proper selected positions longitudinally thereof during the assembling of the device on the shafts. For this purpose, the outer ends of the hub 3 and sleeve 12 are provided with similar counter bores 60—61 respectively, having inwardly tapered reduced portions 62—63 receiving the tapered inner ends 64—65 of split wedging sleeves 67—68 for frictionally securing the hub and sleeve to their respective shafts. For forcing the wedging sleeves home into the tapered bore portions with great pressure and the least amount of effort, leverage means is provided for cooperating between the said sleeves and their respective drive hub and sleeve 12. This leverage means includes internally and externally threaded tightening rings 70—71 threaded into the enlarged outer portions of the bores 60—61 and also threaded onto the outer ends of the wedging sleeves 67—68. The external and internal threads 72 and 73 of the sleeves are of slightly different pitches so that a considerable number of rotations of the rings would be required to slightly advance the wedging rings home. In the outer sides of the wedging rings are a number of apertures 75 providing a suitable connection for an ordinary spanner wrench required to rotate the rings. Thus the parts held by the wedging sleeves 67—68 will be more accurately and firmly held on the shafts in co-axial alignment therewith.

The screw threads of the sleeves upon which the collars 24 and rings 31 are threaded are cut into the longitudinal teeth 9 and 16 of the sleeves to a depth less than the depth of the said teeth so as to provide uninterrupted side portions of the teeth near the bases thereof to form key slots within which the keys 32 and key pins 25 may be firmly engaged.

The clutching discs are made with comparatively narrow contacting faces to prevent them from wearing down so unevenly, due to the radius differential between the inner and outer portions thereof, as to gradually reduce their clamping or clutching efficiency after long usage. Hence, the necessity of adjusting the abutment collars 24 to increase the pressure under which the discs are to be clamped to compensate for such loss in efficiency from time to time will be greatly minimized.

It is intended that the teeth of the clutching discs should be of the smallest size possible consistent with strength required and consequently great in number, especially those of the inner discs to provide maximum angular area of contact, thus reduce and more uniformly distribute torque pressure exerted upon the discs thereabout when cooperating with the sleeves 10 and 12, and to make possible the greatest number of gear teeth on the sleeves 10 and 12 in holding the abutment rings and stop rings in the greatest number of angularly adjusted positions about the sleeves.

I claim:

1. A clutch device including a clutch sleeve having an external gear formation, friction clutching means in sliding coupling connection with the teeth of the clutch sleeve, means for applying the clutching means and adjustable means for regulating the pressure under which said means is to be applied comprising an abutment collar threaded on the sleeve and having releasable means for engaging said teeth of the sleeve whereby the collar may be held thereby at various angularly adjusted positions about the sleeve in accordance with the number of said teeth thereof.

2. A clutch device including a clutch sleeve having an external gear formation, friction clutching means in sliding coupling connection with the teeth of the clutch sleeve, means for applying the clutching means and adjustable means for regulating the pressure under which said means is to be applied comprising an abutment collar threaded on the sleeve and having releasable means for engaging said teeth of the sleeve whereby the collar may be held thereby at various angularly adjusted positions about the sleeve, wherein said releasable means comprises a key releasably connected with the collar and engageable between the teeth of the sleeve and wherein the collar is threaded on threads cut into the top surface of the said teeth to a depth less than the depth of the teeth to form uninterrupted groove portions between the bases of the teeth to receive the key.

3. In combination in a clutch device, a clutching sleeve having a series of longitudinal grooves formed in the periphery thereof, an abutment collar threaded on the sleeve for adjustment therealong into various positions of cooperative relation with respect thereto, a key pin freely received in a radial aperture of the collar and adapted to engage in any one of the series of longitudinal grooves formed in the periphery of the sleeve, to hold the collar in various angularly adjusted positions thereabout, a rotatable shifter sleeve surrounding the collar and movable axially into and out of cooperative relation with respect to the collar having an inner surface portion confining the key in the said aperture and having a threaded aperture registerable therewith to permit removal of the key and the insertion of a tool in the collar aperture to adjust the collar, a plug threaded in the threaded aperture with an inner end formed in the plane of said shifter sleeve inner surface, and releasable means for holding the plug from rotating.

4. A clutch device comprising a coupling sleeve having an external gear formation, friction clutching means in sliding coupling connection with the sleeve, a rotatable shifter sleeve surrounding the coupling sleeve and movable axially into and out of clutch applying position, and means operated by the shifter sleeve when moved into applying position for applying the friction clutching means including adjustable means for regulating the pressure under which said clutching means is to be applied comprising an abutment collar threaded on the coupling sleeve for adjustment therealong between same and the shifter sleeve, a key removably received in an aperture of the collar for engaging the teeth of the sleeve to hold the collar in various angularly adjusted positions thereabout, and the shifter sleeve having an aperture registerable with the aperture of the collar to permit removal of the key therefrom and the insertion of a tool therein to rotate the collar on the clutching sleeve into selected adjusted positions.

5. A clutch device including pressure applied friction clutching means, and means for applying said means comprising an axially shiftable pressure applying ring and an abutment collar axially spaced therefrom and forming therewith an annular outwardly tapered groove, an annular series of rollable elements received in the groove adapted to be contracted therein to shift the ring into applying position, means for contracting and releasing the rollable elements, resilient means in the groove normally resiliently urging said elements outwardly of the groove to insure the release thereof and resilient means normally resiliently urging the pressure applying ring into released position.

6. A clutch device including pressure applied friction clutching means, and means for applying said means comprising an axially shiftable pressure applying ring and an abutment collar axially spaced therefrom and forming therewith an annular outwardly tapered groove, an annular series of rollable elements received in the groove adapted to be contracted therein to shift the ring into applying position, means for contracting and releasing the rollable elements and resilient means normally resiliently urging said elements outwardly of the groove to insure the release thereof, wherein the resilient means comprises a contractable ring of resilient material disposed in the groove below the said elements.

7. A clutch device including pressure applied friction clutching means, and means for applying said means comprising an axially shiftable pressure applying ring and an abutment collar axially spaced therefrom and forming therewith an annular outwardly tapered groove, an annular series of rollable elements received in the groove adapted to be contracted therein to shift the ring into applying position, means for contracting and releasing the rollable elements and resilient means normally resiliently urging said elements outwardly of the groove to insure the release thereof, wherein the resilient means comprises a rubber ring disposed within the said groove below the said elements.

8. A clutch device including a clutch sleeve having an external gear formation, a clutch applying ring reciprocable on the sleeve into and out of clutch applying positions and having an internal gear formation meshing with the teeth of the sleeve, means for operating the ring, and adjustable means for regulating the extent of reciprocation of the ring comprising an abutment collar threaded on the sleeve and having releasable means for engaging said teeth of the sleeve whereby the collar may be held thereby at various longitudinally adjusted positions along the sleeve.

9. A clutch device including a clutch sleeve having an external gear formation, a clutch applying ring reciprocable on the sleeve into and out of clutch applying positions and having an internal gear formation meshing with the teeth of the sleeve, an abutment collar threaded on the sleeve, a key pin removably received in a radial aperture of the collar and engaging the gear teeth of the sleeve to hold the collar at various longitudinally adjusted positions on the sleeve, said collar and ring having opposed sides formed to provide an outwardly tapered groove therebetween, a series of balls arranged in the groove, and cam means for contracting and releasing the balls in said groove to reciprocate the ring and having detachable means for confining the key in the aperture of the collar.

10. A clutch device including a pair of end to end connected clutch sleeves each having an external gear formation, a clutch applying ring reciprocable on each sleeve into and out of clutch applying positions and having an internal gear formation meshing with the teeth of the sleeve, an abutment collar threaded on each sleeve, a key pin removably received in a radial aperture of each collar and engaging the teeth of its respective sleeve to hold the collar at various longitudinally adjusted positions on the sleeve, the collar and ring of each sleeve having opposed sides formed to provide an outwardly tapered groove therebetween, a series of balls arranged in each groove, a longitudinally reciprocable shifter sleeve surrounding both series of balls having internal cam formations for alternately contracting same in their respective grooves to alternately reciprocate the rings when shifted and having an inner surface for confining said key pins in the apertures of the collars, and detachable means on said shifter sleeve forming portions of said surface to permit removal of said key pins in the neutral position of the shifter sleeve.

11. A clutch device including a clutch sleeve, clutch applying means mounted on the sleeve for reciprocation into and out of clutch applying position, means for operating said clutch applying means comprising a rotatable and longitudinally movable shifter sleeve surrounding the clutch sleeve, an abutment collar threaded on the clutch sleeve, and means for releasably locking the abutment collar in various positions of adjustment on the clutch sleeve, said shifter sleeve having an aperture therein for alignment with the locking means to provide access thereto when adjusting the abutment collar.

12. In combination in a clutch device, a pair of axially spaced hubs, a clutch sleeve axially confined between the hubs, pressure applied clutching means for coupling the sleeve with each hub and including rotatable concentric adjusting means for varying the pressure application thereof, a shifter sleeve supported on said hubs for rotation and reciprocation, means for alternately applying said clutch applying means associated with each hub upon reciprocation of the sleeve, said shifter sleeve having a tool opening therein providing access to the adjusting means, said shifter sleeve and said adjusting means being rotatable in unison when making adjustments.

13. A clutch device including pressure applied friction clutching means, an axially shiftable pressure applying ring, an abutment collar axially spaced therefrom and forming therewith a groove whose walls are tapered 80 degrees or more to the horizontal, an annular series of rollable elements received in the groove adapted to be contracted therein to shift the ring into applying position, means for contracting the series of rollable elements and compressible means located in said groove beneath said rollable elements to be compressed by the rollable elements when they are contracted and to force the rollable elements outwardly of the groove when the pressure of the contracting means is released to thereby disengage the clutching means.

14. A clutch device including pressure applied friction clutching means, an axially shiftable pressure applying ring, an abutment collar axially spaced therefrom and forming therewith a groove having one wall disposed at approximately 90 degrees to the horizontal and the other at an angle less than 90 degrees to the horizontal, an annular series of rollable elements received in the groove adapted to be contracted therein to shift the ring into applying position, means for contracting the series of rollable elements and compressible means around which the rollable elements are contracted for shifting the rollable elements outwardly of the groove when the pressure of the contracting means is relaxed to thereby enable the ring to shift to release position.

WILLIAM J. MILLER.